United States Patent
Tsirkin et al.

(10) Patent No.: US 9,304,874 B2
(45) Date of Patent: Apr. 5, 2016

(54) VIRTUAL MACHINE-GUEST DRIVEN STATE RESTORING BY HYPERVISOR

(71) Applicant: Red Hat Israel, Ltd., Ra'anana (IL)

(72) Inventors: Michael Tsirkin, Ra'anana (IL); Radim Krčmář, Slezska Ostrava (CZ)

(73) Assignee: Red Hat Israel, Ltd., Ra'Anana (IL)

( * ) Notice: Subject to any disclaimer, the term of this patent is extended or adjusted under 35 U.S.C. 154(b) by 83 days.

(21) Appl. No.: 14/171,634

(22) Filed: Feb. 3, 2014

(65) Prior Publication Data

US 2015/0220406 A1    Aug. 6, 2015

(51) Int. Cl.
G06F 9/455    (2006.01)
G06F 11/14   (2006.01)

(52) U.S. Cl.
CPC ........ G06F 11/1484 (2013.01); G06F 11/1435 (2013.01); G06F 11/1469 (2013.01)

(58) Field of Classification Search
None
See application file for complete search history.

(56) References Cited

U.S. PATENT DOCUMENTS

| 7,409,717 | B1* | 8/2008 | Szor | 726/24 |
|---|---|---|---|---|
| 7,818,808 | B1 | 10/2010 | Neiger et al. | |
| 8,127,098 | B1 | 2/2012 | Klaiber et al. | |
| 8,312,452 | B2 | 11/2012 | Neiger et al. | |
| 8,607,228 | B2 | 12/2013 | Cota-Robles et al. | |
| 8,612,975 | B2 | 12/2013 | Serebrin et al. | |
| 2008/0155536 | A1 | 6/2008 | Levit-Gurevich et al. | |
| 2009/0037908 | A1* | 2/2009 | Armstrong et al. | 718/1 |
| 2010/0115513 | A1* | 5/2010 | Moriki et al. | 718/1 |
| 2010/0306774 | A1 | 12/2010 | Kalbarga | |
| 2011/0296411 | A1* | 12/2011 | Tang et al. | 718/1 |

OTHER PUBLICATIONS

Amit Vasudevan, Requirements for an Integrity-Protected Hypervisor on the x86 Hardware Virtualized Architecture, retrieved on Apr. 8, 2014 from http://www.hypcode.org/paper-iphyp-TRUST-2010.pdf, 15 pages.

Raj Himanshu et al., Credo: Trusted Computing for Guest VMs with a Commodity Hypervisor, retrieved on Apr. 8, 2014 from http://www.kiayias.com/compsec/CSE4707_Computer_Security/Reading_files/VM-security.pdf, pp. 1-12.

Steve Maresca, VM Security, retrieved Apr. 8, 2014 from http://www.kiayias.com/compsec/CSE4707_Computer_Security/Reading_files/VM-security.pdf, pp. 1-111.

\* cited by examiner

*Primary Examiner* — Kenneth Tang

(74) *Attorney, Agent, or Firm* — Haynes and Boone, LLP

(57) ABSTRACT

An example method of saving and restoring a state of one or more registers for a guest includes detecting exit of a virtual machine mode of a guest running on a virtual machine. A set of registers is accessible by the guest and includes a first subset of registers and a second subset of registers. The method also includes identifying the first subset of registers. The first subset of registers includes one or more registers to be overwritten by the guest upon re-entry of the virtual machine mode. The second subset of registers is mutually exclusive from the first subset of registers. The method further includes after detecting exit of the virtual machine mode of the guest, detecting re-entry of the virtual machine mode of the guest. The method also includes restoring a saved state of the second subset of registers for the guest.

19 Claims, 3 Drawing Sheets

VIRTUAL MACHINE-GUEST DRIVEN STATE RESTORING BY HYPERVISOR

BACKGROUND

The present disclosure generally relates to a computing system, and more particularly to restoring state information in a virtual environment.

A virtual machine is a portion of software that, when executed on appropriate hardware, creates an environment allowing the virtualization of an actual physical computer system. Each virtual machine may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including operating systems known as guest operating systems. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

BRIEF SUMMARY

Methods, systems, and techniques for saving and restoring a state of one or more registers for a guest running on a virtual machine are provided.

According to an embodiment, a method of saving and restoring a state of one or more registers for a guest running on a virtual machine includes detecting exit of a virtual machine mode of a guest running on a virtual machine. The virtual machine is executable on a host. A set of registers is accessible by the guest and includes a first subset of registers and a second subset of registers. The method also includes identifying the first subset of registers. The first subset of registers includes one or more registers to be overwritten by the guest upon re-entry of the virtual machine mode. The method further includes after detecting exit of the virtual machine mode of the guest, detecting re-entry of the virtual machine mode of the guest. The method also includes restoring a saved state of the second subset of registers for the guest. The second subset of registers is mutually exclusive from the first subset of registers.

According to another embodiment, a system for saving and restoring a state of one or more registers for a guest running on a virtual machine includes a memory that stores state information of a guest running on a virtual machine. The virtual machine is executable on a host. The system also includes a detector that detects exit of a virtual machine mode of the guest and detects re-entry of the virtual machine mode of the guest. The system further includes a hypervisor running on a host coupled to the memory. The hypervisor identifies a first subset of registers and restores a saved state of a second subset of registers for the guest. A set of registers is accessible by the guest and includes the first and second subsets of registers. The first subset of registers includes one or more registers to be overwritten by the guest upon re-entry of the virtual machine mode. The first subset of registers is mutually exclusive from the second subset of registers.

According to another embodiment, a non-transitory machine-readable medium includes a plurality of machine-readable instructions that when executed by one or more processors are adapted to cause the one or more processors to perform a method including: detecting exit of a virtual machine mode of a guest running on a virtual machine, the virtual machine executable on a host, and a set of registers being accessible by the guest and includes a first subset of registers and a second subset of registers; identifying the first subset of registers, the first subset of registers including one or more registers to be overwritten by the guest upon re-entry of the virtual machine mode, and the second subset of registers being mutually exclusive from the first subset of registers; after detecting exit of the virtual machine mode of the guest, detecting re-entry of the virtual machine mode of the guest; and restoring a saved state of the second subset of registers for the guest.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
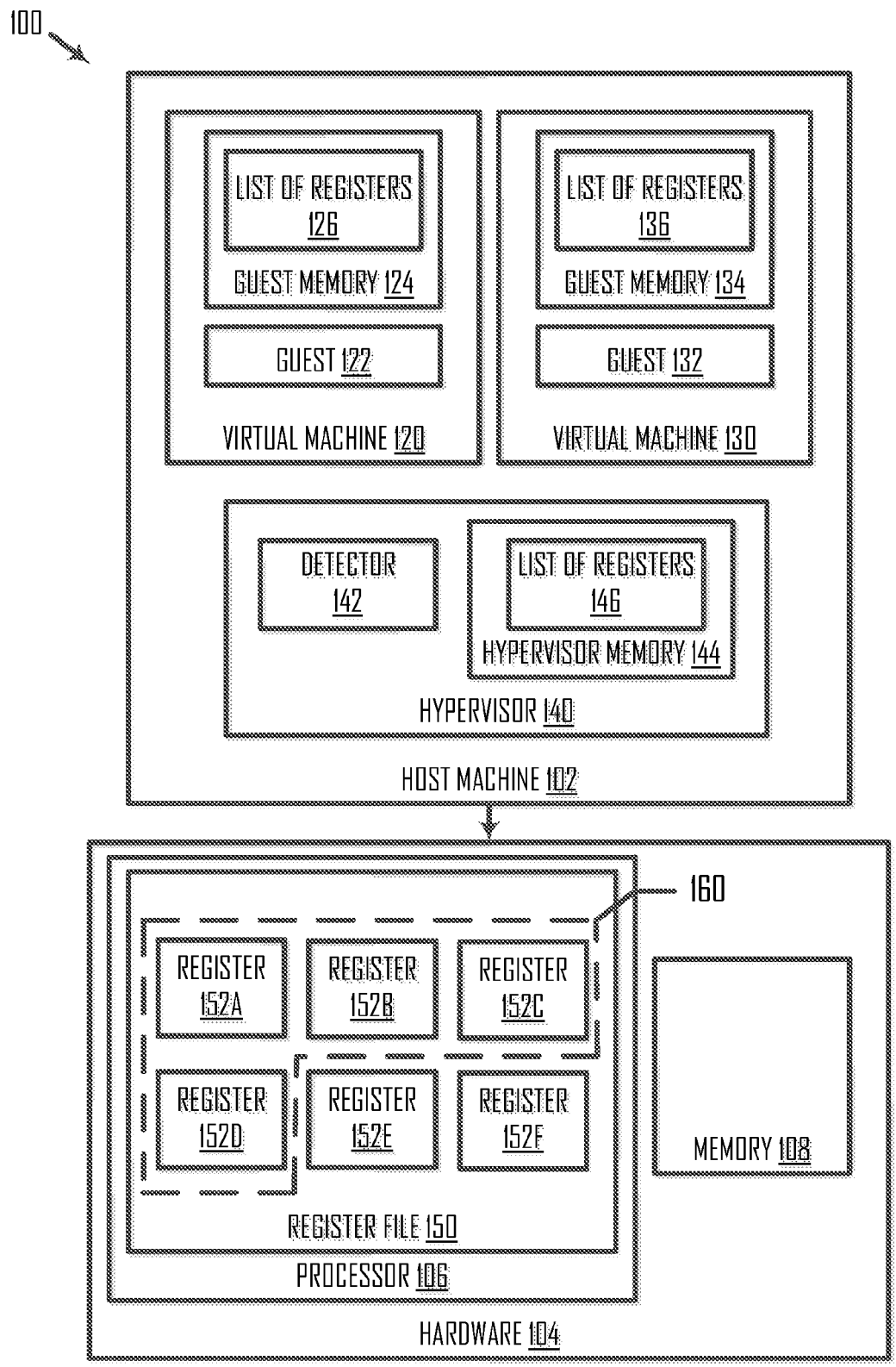
FIG. 1 is a block diagram illustrating a system for saving and restoring a state of one or more registers for a guest running on a virtual machine, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
III. Hypervisor Mode and Virtual Machine Mode
   A. Detect Exit of Virtual Machine Mode of a Guest
   B. Save State Information of the Guest
   C. Detect Re-entry of Virtual Machine Mode of the Guest
   D. Restore a Subset of Registers for Guest
      1. Indicate Which Registers to be Overwritten by Guest
      2. Indicate Which Registers to Restore for Guest
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques for reducing the overhead in relation to the exit or re-entry of a virtual machine mode of a guest. In an embodiment, a system for saving and restoring a state of one or more registers for a guest running on a virtual machine includes a memory that stores state information of a guest running on a virtual machine. The virtual machine is executable on a host. The system also includes a detector that detects exit of a virtual machine mode of the guest and detects re-entry of the virtual machine mode of the guest. The system further includes a hypervisor running on a host coupled to the memory. The hypervisor identifies a first subset of registers and restores a saved state of a second subset of registers for the guest. A set of registers is accessible by the guest and includes the first and second subsets of registers. The first subset of registers includes one or more registers to be overwritten by the guest upon re-entry of the virtual machine mode. The first subset of registers is mutually exclusive from the second subset of registers.

II. Example System Architecture

FIG. 1 is a block diagram illustrating a system 100 for saving and restoring a state of one or more registers for a guest running on a virtual machine, according to an embodiment. System 100 includes a host machine 102 coupled to hardware 104. Hardware 104 includes a processor 106 and a memory 108, and may include other I/O devices. A host machine may host one or more virtual machines (VMs) that run applications and services.

In FIG. 1, host machine 102 includes a VM 120, a VM 130, and a hypervisor 140. Although two VMs are illustrated as executable on host machine 102, other embodiments including fewer than or more than two VMs are within the scope of the present disclosure. The hypervisor may allow multiple operating systems, called guests, to run on the same physical system by offering virtualized hardware to the guest. Each guest has its own state information. Additionally, the host machine may run multiple operating systems, concurrently and in isolation from other programs on a single system. A guest may run a different operating system than another guest executing on the same host machine. Additionally, the guest running on a virtual machine may also be different from the host OS running on host machine 102. The host OS or guest may include, for example, MICROSOFT® WINDOWS®, LINUX®, SOLARIS®, and MAC® OS. Trademarks are the property of their respective owners.

One or more guests and application stacks may be run on top of hypervisor 140. In the example illustrated in FIG. 1, virtual machine 120 is the platform (e.g., virtual hardware) on which a guest 122 runs, and virtual machine 130 is the platform on which a guest 132 runs. Hypervisor 140 owns the real system resources and makes them available to one or more guests that alternately execute on the same hardware. Hypervisor 140 manages hardware resources and arbitrates requests of the multiple guests and application stacks. In an example, hypervisor 140 presents a virtual set of CPU, memory, I/O, and disk resources to each guest either based on the actual physical hardware or based on a standard and consistent selection of custom hardware. A virtual machine has its own address space in memory, its own processor resource allocation, and its own device input/output (I/O) using its own virtual device drivers.

Hypervisor 140 may map a virtual resource or state (e.g., registers, memory, or files) to real resources in the underlying machine. For example, hypervisor 140 may present a guest memory 124 to guest 122 and may also present a guest memory 134 to guest 132. Hypervisor 140 may map the memory locations of guest memory 122 and guest memory 132 to physical memory locations of memory 108. Guest memory 124 may store state information of guest 122 that may be mapped to physical memory locations of memory 108, and guest memory 134 may store state information of guest 132 that may be mapped to physical memory locations of memory 108.

Additionally, the hardware resources are shared among hypervisor 140 and one or more guests. A VM exit marks the point at which a transition is made between the virtual machine currently running and the hypervisor, which takes over control for a particular reason. In the disclosure, the VM exit may be referred to as an exit of a virtual machine mode of a guest or exit of guest 122. Processor 106 saves a snapshot of the state of the virtual machine that was running at the time of exit. A VM exit is handled by hypervisor 140, which decides the appropriate action to take and then transfers control back to the virtual machine via a VM entry. A VM entry marks the point at which a transition is made between the hypervisor and a virtual machine, which takes over control. In the disclosure, the VM entry may be referred to as a (re-) entry of a virtual machine mode of a guest or (re-)entry of guest 122.

III. Hypervisor Mode and Virtual Machine Mode

Host machine 102 may switch between a virtual machine mode of a guest and a hypervisor mode. When host machine 102 is in the virtual machine mode of a particular guest, the particular guest has control of one or more processors 106. When host machine 102 is in the hypervisor mode, the hypervisor has control of one or more processors 106. Host machine 102 may switch from the virtual machine mode of a guest to the hypervisor mode for a variety of reasons. In an example, guest 122 performs a certain operation, such as a privileged instruction that directly involves the shared hardware resources. In such an example, the operation may be intercepted by hypervisor 140, checked for correctness, and performed by hypervisor 140 on behalf of guest 122. Guest 122 may be unaware that hypervisor 140 is performing the work on guest 122's behalf. Host machine 102 may switch from the hypervisor mode to the virtual machine of the guest when, for example, hypervisor 140 is finished processing the operation.

Host machine 102 may also switch between the virtual machine mode of a first guest and virtual machine mode of a second guest. In an example, host machine 102 may switch from the virtual machine mode of guest 122 to the virtual machine mode of guest 132 when control of one or more processors 106 switches from guest 122 to guest 132.

Hypervisor 140 includes a detector 142 and a hypervisor memory 144. In an embodiment, detector 142 detects entry of a virtual machine mode of a guest, exit of the virtual machine mode of the guest, and re-entry of the virtual machine mode of the guest (after it has already exited). Hypervisor memory 144 may store information regarding the state of guest 122, 132.

A. Detect Exit of Virtual Machine Mode of a Guest

In an example, the exit of the virtual machine mode of the guest includes control of one or more processors being transferred from the guest to the hypervisor. In another example, the exit of a virtual machine mode of a first guest includes control of one or more processors being transferred from the first guest to a second guest. When host machine 102 switches from the virtual machine mode of guest 122 to the hypervisor mode or from the virtual machine mode of guest 122 to the virtual machine mode of guest 132, detector 142 detects the exit of the virtual machine mode of guest 122.

In an example, detector 142 detects exit of the virtual machine mode of guest 122 by receiving an interrupt from guest 122. In such an example, hypervisor 140 may intercept the interrupt and service it. To service the interrupt, hypervisor 140 takes control of one or more processors 106 and the virtual machine mode of guest 122 is exited. When host machine 102 is in the hypervisor mode, hypervisor 140 may service the interrupt. When hypervisor 140 is done servicing the interrupt, host machine 102 may switch from hypervisor mode back to the virtual machine mode of guest 122 or to another mode (e.g., virtual machine mode of guest 132). In another example, detector 142 detects exit of the virtual machine mode of guest 122 by receiving a notification that guest 122 has executed a privileged instruction that causes the exit of the virtual machine mode of guest 122 and entry of the hypervisor mode. In an example, the privileged instruction may be an I/O operation, an access to non-present memory, or a hypercall.

An exit reason indicates the reason that guest 122 exited. In an example, the exit reason may be stored in guest memory 124, and hypervisor 140 may access the appropriate physical memory location of memory 108 that maps to guest memory 124 storing the exit reason. In another example, guest 122 may send a communication including the exit reason to hypervisor 140, which then stores the exit reason into hypervisor memory 144. The exit reason may be, for example, that guest 122 sent an interrupt or executed a hypercall that caused hypervisor 140 to take over control of one or more processors 106. An exit code may contain information regarding the virtual machine's exit cause and nature. In an example, a first exit code (e.g., 0) indicates that the exit reason is an interrupt and a second exit code (e.g., 1) indicates that the exit reason is a hypercall, and the exit code is stored in memory for later retrieval.

B. Save State Information of the Guest

Processor 106 includes a register file 150 including an array of processor registers. In FIG. 1, register file 150 includes registers 152A-152F. One or more registers of registers 152A-152F may include one or more floating point registers and/or one or more general purpose registers. The following is a description of VM 120 and guest 122. This description may apply as well to VM 130 and guest 132. Hypervisor 140 may make a set of registers accessible by guest 122, and guest 122 may store values in the registers to which it has access. For example, hypervisor 140 may make registers 152A-152D of set of registers 152A-152F accessible by guest 122. In such an example, guest 122 is unable to access registers 152E and 152F.

When detector 142 detects exit of virtual machine mode of guest 122, processor 106 may save a snapshot of the state of registers 152A-152D such that when detector 142 detects re-entry of the virtual machine mode of guest 122, the saved state information may be restored and ready for use by guest 122. Upon re-entry, however, it may be unnecessary to save all of the registers to which guest 122 previously had access because guest 122 may not use some of these registers in the near future. The guest is aware of which registers it intends to use and may make hypervisor 140 aware of this. Thus, the guest may drive the decision on which registers hypervisor 140 should save for guest 122.

In an embodiment, hypervisor 140 identifies a first subset 160 of a set of registers accessible by guest 122. First subset of registers 160, indicated within dashed lines in FIG. 1, includes one or more registers to be saved for guest 122 upon re-entry of the virtual machine mode of guest 122. Thus, it may be unnecessary to save the full set of registers accessible by guest 122. In keeping with the above example that registers 152A-152D are accessible by guest 122, first subset of registers 160 may be registers 152A-152C. In such an example, responsive to detector 142 detecting exit of a virtual machine mode of guest 122, hypervisor 140 may save a state of registers 152A-152C (e.g., in hypervisor memory 144) and not save the state of register 152D. One or more registers of registers 152A-152C may include one or more floating point registers and/or one or more general purpose registers.

Hypervisor 140 may identify first subset of registers 160 to save for guest 122 in a variety of ways. In an example, hypervisor 140 receives a communication indicating first subset of registers 160 to be saved for guest 122. Guest 122 may send the communication, and hypervisor 140 may trap the communication, identify first subset of registers 160 from the communication, and record first subset of registers 160 into a list of registers 146 of hypervisor memory 144. List of registers 146 may store information regarding one or more guests and state information of the one or more guests. In the example illustrated in FIG. 1, list of registers 146 may store the one or more registers to save for one or more guests. In an example, hypervisor 140 receives a request to save, upon exit of the virtual machine mode of guest 122, the state of first subset of registers 160, registers 152A-152C. The request may be from guest 122. Hypervisor 140 may later identify first subset of registers 160 from, for example, hypervisor memory 144. Hypervisor memory 144 may include random access memory (RAM) and/or disk memory.

In another example, guest 122 includes a list of registers 126, and guest 123 includes a list of registers 136. List of registers 126, 136 may indicate which registers to save for guest 122, 123, respectively. Guest 122 may record the one or more registers that guest 122 intends to use into list of registers 126. List of registers 126 may map to a set of physical memory locations of memory 108, and hypervisor 140 may identify first subset of registers 160 from the set of physical memory locations of memory 108. The set of physical memory locations of memory 108 may be shared between hypervisor 140 and guest 122.

In another example, guest 122 may execute a hypercall that causes host machine 102 to enter the hypervisor mode. In an example, the hypercall may include first subset of registers 160, and hypervisor 140 may identify first subset of registers 160 from the hypercall. In another example, the hypercall may cause hypervisor 140 to perform a series of actions in order to identify first subset of registers 160. For example, when guest 122 executes a privileged instruction, hypervisor 140 may save a state of a given register and load into the given register an exit reason based on a previous exit of the virtual machine mode. Hypervisor 140 may then determine, based on at least a portion of the exit reason and a value of one or more registers, first subset of registers 160. In such an example, hypervisor 140 may examine the high bit stored in a register (e.g., the given register or the one or more registers) and determine first subset of registers 160 based on the high bit. For example, if the high bit is low hypervisor 140 may determine that no registers should be saved for the guest, and if the high bit is high hypervisor 140 may determine that one or more particular registers should be saved for the guest.

C. Detect Re-Entry of Virtual Machine Mode of the Guest

After detecting exit of the virtual machine mode of guest 122, detector 142 may detect re-entry of the virtual machine mode of guest 122. Upon re-entry, guest 122 may take over control of one or more processors 106 and may desire to resume execution of a set of instructions that guest 122 was in the process of executing before the previous exit of guest 122. Hypervisor 140 may restore the saved state of one or more registers of first subset of registers 160 for guest 122 to use as discussed further below.

D. Restore a Subset of Registers for Guest

In keeping with the above example, when detector 142 detects re-entry of virtual machine mode of guest 122, processor 106 may restore one or more saved states of registers 152A-152C such that it is ready for use by guest 122. Upon re-entry, however, it may be unnecessary to restore all of the registers from which state information was saved (e.g., registers 152A-152C) or to which guest 122 previously had access (e.g., registers 152A-152D) because guest 122 may overwrite some of these registers upon re-entry. Thus, the guest may drive the decision on which registers hypervisor 140 should restore for guest 122 such that it may use these restored registers upon re-entry of guest 122.

1. Indicate which Registers to be Overwritten by Guest

The guest may be aware of which registers it intends to overwrite and may make hypervisor 140 aware of this. In an embodiment, hypervisor 140 identifies a second subset of registers accessible by guest 122, where the second subset of registers includes one or more registers to be overwritten by guest 122 upon re-entry of guest 122. Thus, it may be unnecessary to restore the one or more registers to be overwritten by guest 122. In particular, it may be unnecessary to restore all of the registers that were previously saved for guest 122 and all of the registers that are accessible by guest 122.

In keeping with the above example that first subset of registers 160 include one or more registers to save for guest 122 and may be registers 152A-152C, the second subset of registers (which includes one or more registers that guest 122 intends to overwrite) may be register 152C. Guest 122 may intend to overwrite the contents of register 152C, making it unnecessary to restore the state of this register. In such an example, responsive to detector 142 detecting re-entry of the virtual machine mode of guest 122, hypervisor 140 may restore a saved state of the third subset of registers, registers 152A and 152B for guest 122 to use. In such an example, no registers that the guest intends to overwrite are restored. The second subset of registers may be mutually exclusive from the third subset of registers. Hypervisor 140 may identify the second subset of registers similar to the techniques described above in relation to identifying first subset of registers 160.

One or more registers of registers 152A and 152B may include one or more floating point registers and/or one or more general purpose registers. Guest 122 may still use register 152C but without regard to what was previously stored in the register. Registers 152A-152D (e.g., registers to save for the guest) is a superset of registers 152C (e.g., registers that the guest intends to overwrite) and of registers 152A and 152B (e.g., registers to restore for the guest).

2. Indicate which Registers to Restore for Guest

Alternatively, rather than identify one or more registers that are to be overwritten by the guest upon re-entry of the virtual machine mode, hypervisor 140 may identify one or more registers that are to be restored for the guest upon re-entry of the virtual machine mode. In an embodiment, hypervisor 140 identifies a third subset of registers accessible by guest 122, where the third subset of registers includes one or more registers to be restored for guest 122 upon re-entry of guest 122. Thus, it may be unnecessary to restore all of the registers that are accessible by guest 122.

In keeping with the above example that first subset of registers 160 include one or more registers to save for guest 122 and may be registers 152A-152C, the third subset of registers (which includes one or more registers to restore for guest 122) may be registers 152A and 152B. Guest 122 may intend to use the contents stored in register 152C before the previous exit of guest 122. In such an example, responsive to detector 142 detecting re-entry of the virtual machine mode of guest 122, hypervisor 140 may restore a saved state of the third subset of registers, registers 152A and 152B for guest 122 to use. Hypervisor 140 may identify the third subset of registers similar to the techniques described above in relation to identifying first subset of registers 160. One or more registers of registers 152A and 152B may include one or more floating point registers and/or one or more general purpose registers.

Further, when detector 142 detects exit of guest 122 again, the whole process may start again with the same or different registers. As discussed above and further emphasized here, FIG. 1 is merely an example, which should not unduly limit the scope of the claims.

IV. Example Method

Figure 2:
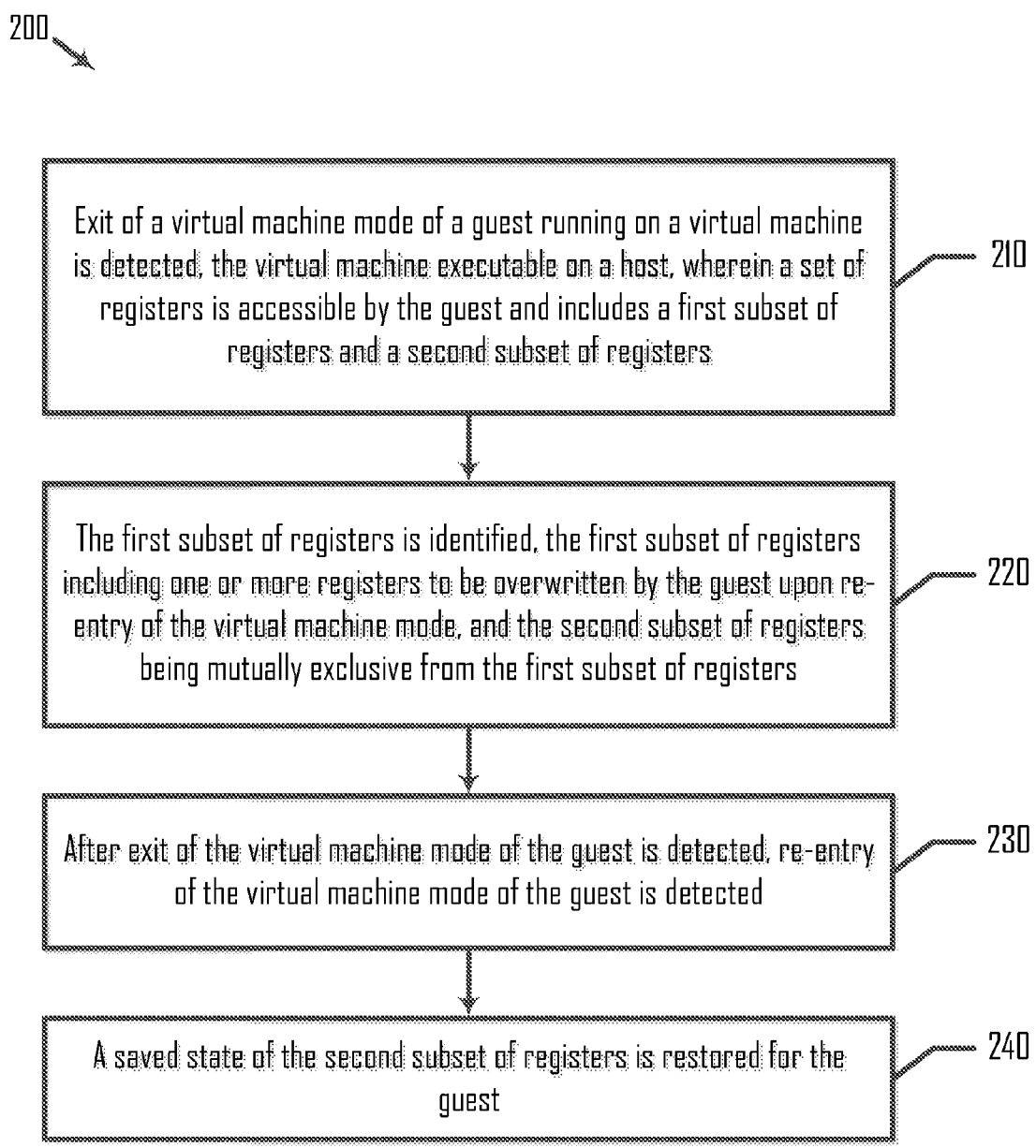
FIG. 2 is a flowchart illustrating a method of saving and restoring a state of one or more registers for a guest running on a virtual machine, according to an embodiment.

FIG. 2 is a flowchart illustrating a method 200 of saving and restoring a state of one or more registers for a guest running on a virtual machine, according to an embodiment. Method 200 is not meant to be limiting and may be used in other applications.

In FIG. 2, method 200 includes blocks 210-240. In a block 210, exit of a virtual machine mode of a guest running on a virtual machine is detected, the virtual machine executable on a host, wherein a set of registers is accessible by the guest and includes a first subset of registers and a second subset of registers. In an example, detector 142 detects exit of a virtual machine mode of guest 122 running on virtual machine 120, virtual machine 120 executable on a host machine 102, wherein a set of registers 152A-152D is accessible by guest 122 and includes a first subset of registers 152C and a second subset of registers 152A and 152B.

In a block 220, the first subset of registers is identified, the first subset of registers including one or more registers to be overwritten by the guest upon re-entry of the virtual machine mode, and the second subset of registers being mutually exclusive from the first subset of registers. In an example, hypervisor 140 identifies first subset of registers 152C, the first subset of registers including one or more registers to be overwritten by guest 122 upon re-entry of the virtual machine mode, and the second subset of registers 152A and 152B being mutually exclusive from the first subset of registers.

In a block 230, after exit of the virtual machine mode of the guest is detected, re-entry of the virtual machine mode of the guest is detected. In an example, after detector 142 detects exit of the virtual machine mode of guest 122, detector 142 detects re-entry of the virtual machine mode of guest 122.

In a block 240, a saved state of the second subset of registers is restored for the guest. In an example, hypervisor 140 restores a saved state of second subset of registers 152A and 152B for guest 122.

It is also understood that additional processes may be inserted before, during, or after blocks 210-240 discussed above. It is also understood that one or more of the blocks of method 200 described herein may be omitted, combined, or performed in a different sequence as desired.

V. Example Computing System

Figure 3:
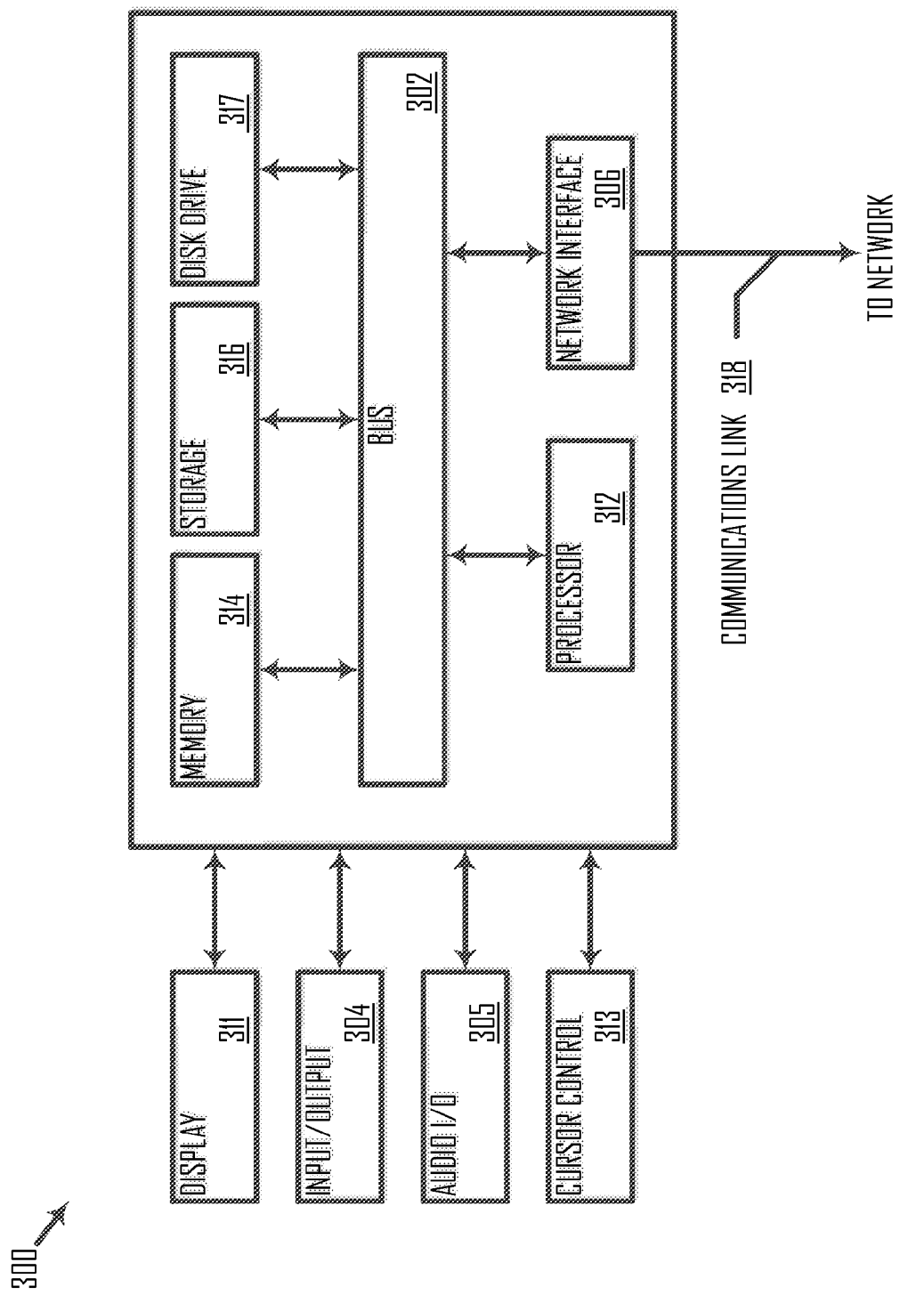
FIG. 3 is a block diagram of an electronic system suitable for implementing one or more embodiments of the present disclosure.

FIG. 3 is a block diagram of a computer system 300 suitable for implementing one or more embodiments of the present disclosure. Each of virtual machine 120, virtual machine 130, and hypervisor 140 may execute on a computing device. The computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 300 includes a bus 302 or other communication mechanism for communicating information data, signals, and information between various components of computer system 300. A processor 312, which may be a micro-controller, digital signal processor (DSP), or other processing component, processes these various signals, such as for display on computer system 300 or transmission to other devices via communication link 318. Components of computer system 300 also include a system memory component 314 (e.g., RAM), a static storage component 316 (e.g., ROM), and/or a disk drive 317. Computer system 300 performs specific operations by processor 312 and other components by executing one or more sequences of instructions contained in system memory component 314.

To enable processor 312 to access data stored in the memory space of the other, an application is executed that includes instructions that manually copy data back and forth between the separate memory spaces. Components include an input/output (I/O) component 304 that processes a user action, such as selecting keys from a keypad/keyboard, selecting one or more buttons or links, etc., and sends a corresponding signal to bus 302. I/O component 304 may also include an output component such as a display 311, and an input control such as a cursor control 313 (such as a keyboard, keypad, mouse, etc.). An optional audio input/output component 305 may also be included to allow a user to use voice for inputting information by converting audio signals into information signals. Audio I/O component 305 may allow the user to hear audio. A transceiver or network interface 306 transmits and receives signals between computer system 300 and other devices via a communication link 318 to a network. In an embodiment, the transmission is wireless, although other transmission mediums and methods may also be suitable.

Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 314, and transmission media includes coaxial cables, copper wire, and fiber optics, including wires that include bus 302. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of saving and restoring a state of one or more registers for a guest running on a virtual machine, comprising:

detecting exit of a virtual machine mode of a guest running on a virtual machine, the virtual machine executable on a host, wherein a set of registers is accessible by the guest and includes a first subset of registers and a second subset of registers;

identifying the first subset of registers, the first subset of registers including one or more registers to be overwritten by the guest upon re-entry of the virtual machine mode, and the second subset of registers being mutually exclusive from the first subset of registers;

after detecting exit of the virtual machine mode of the guest, detecting re-entry of the virtual machine mode of the guest; and restoring a saved state of the second subset of registers for the guest, wherein no registers of the first subset of registers are restored in response to the detected re-entry.

2. The method of claim 1, wherein the set of registers includes a third subset of registers, the method further including:
responsive to the detecting exit of a virtual machine mode of a guest, saving a state of the third subset of registers, the third subset of registers including the second subset of registers.

3. The method of claim 1, further including:
receiving a request to save, upon exit of the virtual machine mode of the guest, the state of the second subset of registers, the request being from the guest.

4. The method of claim 1, further including:
receiving a communication indicating the first subset of registers to be overwritten by the guest, the communication being from the guest, wherein the identifying includes identifying the first subset of registers from the communication.

5. The method of claim 1, further including:
saving a state of a given register;
loading into the given register an exit reason based on a previous exit of the virtual machine mode; and
determining, based on at least a portion of the exit reason and a value of one or more registers, the second subset of registers to restore for the guest.

6. The method of claim 1, wherein the set of registers includes one or more floating point registers.

7. The method of claim 1, wherein the set of registers includes one or more general purpose registers.

8. The method of claim 1, wherein the exit of a virtual machine mode includes control of one or more processors being transferred from the guest to a host.

9. The method of claim 1, wherein the detecting exit of a virtual machine mode includes receiving a notification that the guest has executed a privileged instruction that causes the exit of the virtual machine mode of the guest and entry of a hypervisor mode.

10. The method of claim 9, wherein the privileged instruction is an access to non-present memory.

11. The method of claim 9, wherein the privileged instruction is a hypercall.

12. The method of claim 1, wherein the detecting exit of a virtual machine mode includes receiving an interrupt.

13. The method of claim 1, wherein the guest determines the second subset of registers.

14. A system for saving and restoring a state of one or more registers for a guest running on a virtual machine, comprising:
a memory that stores state information of a guest running on a virtual machine, wherein the virtual machine is executable on a host;
a detector that detects exit of a virtual machine mode of the guest and detects re-entry of the virtual machine mode of the guest; and
a hypervisor running on a host coupled to the memory, wherein the hypervisor identifies a first subset of registers and restores a saved state of a second subset of registers for the guest, wherein a set of registers is accessible by the guest and includes the first and second subsets of registers, wherein the first subset of registers includes one or more registers to be overwritten by the guest upon re-entry of the virtual machine mode, wherein the first subset of registers is mutually exclusive from the second subset of registers, and wherein no registers of the first subset of registers are restored in response to the detected re-entry.

15. The system of claim 14, wherein the set of registers includes a third subset of registers that includes the second subset of registers, and wherein responsive to the detection of the exit of the virtual machine mode the hypervisor saves a state of the third subset of registers into the memory.

16. The system of claim 14, wherein no registers of the first subset of registers is restored.

17. The system of claim 14, wherein the detector receives a notification that the guest has executed a hypercall that causes the exit of the virtual machine mode of the guest and entry of a hypervisor mode, wherein responsive to the hypercall the hypervisor saves a state of a given register, loads into the given register an exit reason based on a previous exit of the virtual machine mode, and determines, based on at least a portion of the exit reason and a value of one or more registers, the second subset of registers to restore for the guest.

18. The system of claim 14, wherein in response to the host switching from a virtual machine mode to a hypervisor mode, the detector detects the exit of the virtual machine.

19. A non-transitory machine-readable medium comprising a plurality of machine-readable instructions that when executed by one or more processors is adapted to cause the one or more processors to perform a method comprising:
detecting exit of a virtual machine mode of a guest running on a virtual machine, the virtual machine executable on a host, wherein a set of registers is accessible by the guest and includes a first subset of registers and a second subset of registers;
identifying the first subset of registers, the first subset of registers including one or more registers to be overwritten by the guest upon re-entry of the virtual machine mode, and the second subset of registers being mutually exclusive from the first subset of registers;
after detecting exit of the virtual machine mode of the guest, detecting re-entry of the virtual machine mode of the guest; and
restoring a saved state of the second subset of registers for the guest, wherein no registers of the first subset of registers are restored in response to the detected re-entry.

* * * * *